(12) United States Patent
Sugihara

(10) Patent No.: US 8,016,368 B2
(45) Date of Patent: Sep. 13, 2011

(54) STRUCTURE OF RUBBER CRAWLER TRACK

(75) Inventor: Shingo Sugihara, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 11 days.

(21) Appl. No.: 12/306,047

(22) PCT Filed: Jun. 22, 2007

(86) PCT No.: PCT/JP2007/062631
§ 371 (c)(1),
(2), (4) Date: Dec. 22, 2008

(87) PCT Pub. No.: WO2007/148800
PCT Pub. Date: Dec. 27, 2007

(65) Prior Publication Data
US 2009/0302677 A1 Dec. 10, 2009

(30) Foreign Application Priority Data
Jun. 22, 2006 (JP) .................................. 2006-173128

(51) Int. Cl.
*B62D 55/24* (2006.01)
*B62D 55/253* (2006.01)

(52) U.S. Cl. ..................... 305/166; 305/167; 305/170

(58) Field of Classification Search .................. 305/157, 305/165, 166, 167, 169, 170, 171, 173, 174, 305/176, 177, 194, 195, 175
See application file for complete search history.

(56) References Cited

U.S. PATENT DOCUMENTS

| 3,712,689 | A | * | 1/1973 | Chaumont | 305/166 |
| 3,754,798 | A | * | 8/1973 | Chaumont | 305/166 |
| 6,799,815 | B2 | * | 10/2004 | Krishnan et al. | 305/165 |
| 7,048,344 | B2 | * | 5/2006 | Courtemanche | 305/165 |
| 7,293,844 | B2 | * | 11/2007 | Uchiyama | 305/166 |
| 2002/0024256 | A1 | | 2/2002 | Hori et al. | |

(Continued)

FOREIGN PATENT DOCUMENTS
CN 1669862 A 9/2005
(Continued)

OTHER PUBLICATIONS
European Search Report dated Jul. 17, 2009 (5 pages).
(Continued)

*Primary Examiner* — Kip Kotter
(74) *Attorney, Agent, or Firm* — Sughrue Mion, PLLC

(57) ABSTRACT

A rubber crawler track having less wear at its left and right end portions to improve its durability. The rubber crawler track has steel cords 12 embedded in the longitudinal direction of the track and has a rubber lug 15 formed on the outer periphery side thereof. The rubber crawler track is constructed from three kinds of rubbers that are an inner peripheral side rubber (a), an outer peripheral side rubber (b), and an edge rubber (c) at the left and right of the rubber crawler track. The edge rubber (c) is a rubber layer having the highest hardness degree. The ground contact side, inner peripheral side and ends in the width direction have different kinds of rubber, and the edge rubber (c) having excellent wear resistance with a hardness degree of 72 (JIS A) or greater is placed in particular at the machine body side end of the rubber crawler track because of the significant wear at this location.

6 Claims, 4 Drawing Sheets

U.S. PATENT DOCUMENTS

2006/0061212 A1   3/2006   Uchiyama

FOREIGN PATENT DOCUMENTS

| | | | |
|---|---|---|---|
| EP | 0 895 924 A2 | | 2/1999 |
| EP | 1 640 254 A1 | | 3/2006 |
| JP | 55140662 A | * | 11/1980 |
| JP | 55140663 A | * | 11/1980 |
| JP | 56090776 A | * | 7/1981 |
| JP | 04-011190 U | | 1/1992 |
| JP | 04-138979 A | | 5/1992 |
| JP | 04-243671 A | | 8/1992 |
| JP | 08011756 A | * | 1/1996 |
| JP | 2002-337767 A | | 11/2002 |
| JP | 2003-335275 A | | 11/2003 |
| JP | 2005-212741 A | | 8/2005 |
| JP | 2005-271874 A | | 10/2005 |

OTHER PUBLICATIONS

Chinese Office Action dated Apr. 27, 2010.

* cited by examiner

STRUCTURE OF RUBBER CRAWLER TRACK

TECHNICAL FIELD

The present invention is an invention for improving the durability of a rubber crawler track, and in particular an invention that improves flaw due to wear of edge portions of the rubber crawler track.

RELATED ART

Generally two kinds of rubber have been used for configuring metal core-containing rubber crawler tracks or metal core-less rubber crawler tracks (referred to below simply as rubber crawler tracks where appropriate), an outer peripheral side rubber (lug side rubber) and an inner peripheral face rubber. Of these two rubbers the lug side rubber is for the surface that contacts the ground, and the wear resistance and durability to cuts thereof are particular important. The inner peripheral face side rubber is for the surface driven by roller, mud and sand that gets caught up presses against the rubber surface, and this repeatedly occurs so it can lead to an eroded state of the surface, so a rubber that is excellent in resistance to external damage is disposed here. These two kinds of rubber are stacked in an unvulcanized state within a mold for molding the rubber crawler track, and then the whole body is vulcanized together to give a construction with the internal and outer peripheral side rubbers laminated at the end portions of the rubber crawler track in the width direction.

Explanation will now be given of a conventional metal core-containing rubber crawler track 10 with reference to FIG. 1 and FIG. 2. FIG. 1 is a cross-section along the width direction of the rubber crawler track, and FIG. 2 is a diagram showing the situation during molding the rubber crawler track 10. The rubber crawler track 10 continues forwards out of, and backwards into, the plane of the paper of FIG. 1. Reference numeral 11 indicates a metal core embedded with a specific pitch along the longitudinal direction of the rubber crawler track 10, and reference numeral 12 indicates steel cords embedded at the same time along the longitudinal direction of the rubber crawler track 10 around the outside of the metal core 11. Reference a indicates the inner peripheral side rubber, and reference b indicates the outer peripheral side rubber. A rubber with excellent resistance to external damage is used for the inner peripheral side rubber a, in order to reduce the degree of erosion state thereof. On the other hand, the outer peripheral side rubber b is for ground contact side and is from the rubber used for configuring rubber lugs 15. Therefore a rubber with excellent wear resistance and durability to cuts is used therefor. It should be noted that in addition to these components there is also a covering rubber 13 provided for covering the steel cords 12, and an intermediate rubber 17 provided for adhesion between the metal core 11 and the steel cords 12.

As shown in FIG. 2, unvulcanized rubbers a1, b1 with their respective characteristics are set in a mold 20 for molding the rubber crawler track, with the metal core 11 disposed between the unvulcanized rubber a1 and unvulcanized rubber b1, and then these are formed into a single body by vulcanizing with heat and pressure. The ends of the rubber crawler track in the width direction are therefore positions where these two kinds of rubber are laminated together.

The rubber crawler track runs while it is spanned across between an idler and a sprocket provided at a shaft extending from a drive device of the machine body side. However, mud and gravel etc. readily accumulates between the machine body and the rubber crawler track, and in particular in the vicinity of the shaft provided to the sprocket. When such piled material dries it readily hardens, with wear and cracking readily occurring at a portion where this material contacts the rubber crawler track, in particular at the width direction ends thereof.

Namely such piled material is sandwiched between the machine body and the rubber crawler track, and scratch damage occurs at the ends 10A in the width direction of the rubber crawler track 10 (mainly on the inner peripheral side), as shown in FIG. 3. There becomes wear portions 10B at the ends 10A of the rubber crawler track 10 (mainly on the inner peripheral side end portion), with rubber defects developing. Water penetrates at these locations and rusting of the steel cords 12 occurs, and depending on the circumstances this sometimes leads to broken steel cords 12.

The use of rubber of high hardness for the left and right edges of rubber crawler tracks is a feature already employed in patent document 1 (see patent document 1). However the objective to be solved in patent document 1 is only to prevent the occurrence of cracks in the vicinity of the edges of the metal core.

Therefore, in patent document 1 a fiber layer is embedded so as to wrap around the edges of the metal core, disposed in a circular arc manner, and a high hardness rubber layer is also disposed as a similar circular arc manner along the fiber layer. Namely in the invention of patent document 1 the technical idea is to embed a high hardness rubber layer in the rubber crawler track edges, but regarding the rubber layers of the inner and outer peripheral side, theses are configured as conventional.

Patent Document 1: Japanese Patent Application Laid-Open (JP-A) No. 2005-271874.

DISCLOSURE OF THE INVENTION

Problem to be Solved by the Invention

The technology shown in patent document 1 simply shows that, for preventing cracks in the vicinity of the edges of the metal core, a fiber layer being curved is disposed with a rubber type of high hardness covering the fiber layer being also curved, and is embedded within ordinary rubber. The type of rubber used in the ends of the rubber crawler track (the external portions exposed to the outside) are fundamentally no different from conventional rubbers, resulting in a structure unable to prevent wear at the position of the rubber crawler track by contacting the piled and hardened mud and sand etc.

The objective of the present invention is to address the above problem, to reduce wear at the rubber crawler track edges, and improve durability.

Method of Solving the Problem

In a non-limiting embodiment of the present invention, the rubber crawler track is configured to include at least three kinds of rubbers including: an inner peripheral side rubber (a) that is disposed at the inner peripheral side of the rubber crawler track, an outer peripheral side rubber (b) that is disposed at the outer peripheral side of the rubber crawler track, and edge rubbers (c) that are disposed at both end portions in the width direction of the rubber crawler track.

The required characteristics of the kinds of rubber used in the rubber crawler track depend on their locations of disposition, in the present invention, changing the kind of rubber applied according to the location for the ground contact side, inner peripheral side, and width direction end portions, enables the optimum rubber to be used for the ground contact side, inner peripheral side and width direction end portions, enabling the functionality of the rubber crawler track to be effectively achieved.

Furthermore, the edge rubber (c) is a rubber layer with the highest hardness.

Lessening of wear and improvement in durability is enabled at the location, the wear in the location being caused by contacting with low hardness and piled material, by the edge rubber (c) being the rubber layer with the highest hardness.

In particular, the edge rubber (c) at least one in the rubber crawler track width direction (at the machine body side when mounted) is preferably the rubber layer with the highest hardness, since wear is severe at the rubber crawler track end on the machine body side. It should be noted that it is preferable for the edge rubber (c) at both sides to be the rubber layer with the highest hardness when taking into consideration of reversing of the mounting direction.

The hardness degree of the edge rubber (c) is preferably 72 hardness degrees or greater (JIS A), with a hardness degree of 72 to 90 (JIS A) more preferable. High wear resistance is obtained by the edge rubber (c) being 72 hardness degrees or greater, and the end portion of the rubber crawler track is not readily worn down.

Also, the edge rubber (c) is disposed so as to cover an edge portion of the steel cord.

Prevention of the edge portion of the steel cord being laid bare due to wear, and an increase in the durability of the rubber crawler track is enabled by disposing the edge rubber (c) so as to cover the edge portion of the steel cord.

The edge rubber (c) can also be disposed so as to cover an edge portion of a metal core.

Prevention of the edge portion of the metal core being laid bare due to wear, and an increase in the durability of the rubber crawler track is enabled by disposing the edge rubber (c) so as to cover an edge portion of the metal core.

In a non-limiting embodiment, the edge rubber (c) has a width of at least 25 mm or greater from the end portion of the rubber crawler track.

The effect by providing the edge rubber (c) is obtainable as long as the edge rubber (c) has a width of at least 25 mm or greater from the end portion of the rubber crawler track, for example the effect is obtainable even in a metal core-less rubber crawler track.

Furthermore, the edge rubber (c) is present at least at the inner peripheral side of the rubber crawler track.

In the rubber crawler track, the edge rubber (c) is preferably disposed on the inner peripheral side, this is since wear due to the piled material occurs at from the end portion to the inner peripheral side.

The edge rubber (c) is present at least at the ground contact face of the rubber crawler track.

The edge rubber (c) is preferably disposed at the ground contact face of the rubber crawler track since the ground contact face end portion is worn by flexing of the machine underbody.

Additionally, the edge rubber (c) is continuous in the peripheral direction.

The wear resistance over the entire end portion in the peripheral direction can be raised by provision of the edge rubber (c) continuous in the longitudinal direction of the rubber crawler track 10.

Furthermore, the edge rubber (c) is an SBR rubber.

The wear resistance of the end portion of the rubber crawler track can be improved by using an SBR rubber for the edge rubber (c).

In another non-limiting embodiment, the rubber crawler track structure includes a metal core with at least a portion thereof embedded in the rubber, in addition to the inner peripheral side rubber (a), the outer peripheral side rubber (b) and the edge rubber (c), the rubber crawler track further includes at least one of: a covering rubber covering the steel cords; an intermediate rubber disposed between the metal core and the steel cords; or a rubber for forming a guide projection for engaging in a driving recess provided in a sprocket surface.

The rubber configuring the rubber crawler track requires at least the three rubbers of the inner peripheral side rubber (a), the outer peripheral side rubber (b) and the edge rubber (c). However, one or more other rubber may also be used from a covering rubber covering the steel cords; an intermediate rubber disposed between the metal core and the steel cords; and a rubber for forming a guide projection for engaging in a driving recess provided in a sprocket surface. Optimum rubbers can also be used for other positions than the inner peripheral side, outer peripheral side and end portions, enabling functionality of the rubber crawler track to be achieved more effectively.

Effect of the Invention

The required characteristics of types of rubber used in a rubber crawler track differ depending on the disposition locations, however since the type of rubber applied can be varied according to the location at the ground contact side, inner peripheral side, and width direction end portions, this enables functionality of the rubber crawler track to be achieved effectively.

An improvement can be made in the wear resistance by the edge rubber (c) being the rubber layer with the highest hardness degree.

High wear resistance can be obtained by the edge rubber (c) being 72 hardness degree or above, and the end portion of the rubber crawler track is not readily worn.

The edge portion of the steel cord can be prevented from being laid bare due to wear, enabling an increase in the durability of the rubber crawler track.

The edge portion of the metal core can be prevented from being laid bare due to wear, enabling an increase in the durability of the rubber crawler track. Wear at the end portion provided with the edge rubber (c) is lessened, and an improvement in the durability can be achieved with certainty.

Wear from the end portion up to the inner peripheral side is lessened, and the durability can be improved.

Wear at the ground contact face end portion is lessened, and the durability can be improved.

High wear resistance over the entire end portion in the peripheral direction can be obtained.

High wear resistance at the end portion of the rubber crawler track is obtainable.

Finally, the functionality of the rubber crawler track can be achieve even more effectively.

BEST MODE OF IMPLEMENTING THE INVENTION

Normally, rubbers used for configuring the inner and outer peripheral faces of rubber crawler tracks are rubbers of about 60 to 65 hardness. A rubber layer having hardness of distinctly different properties of those is disposed at locations, where wear may readily occur, of the rubber crawler track. It should be noted that an SBR rubber type is usually used for such a rubber layer, and there are no particular limitations thereto. In order to improve wear resistance it is possible to fill a filler of a reinforcement material within the rubber, such as a resin material, cut fibers or the like. It is also preferable for the edge rubber (c) to be present at least at the inner peripheral side of the rubber crawler track.

With respect to the properties of the rubber of the edges of the rubber crawler track, obviously rubber is used with excellent wear resistance and resistance to external damage, however there are only moderate requirements for bendability in comparison to the rubber used for the ground contact portions on the outer peripheral side. Use of the rubber type of the present invention is also a counter measure against disorder of the steel cord during vulcanization molding.

Figure 4:
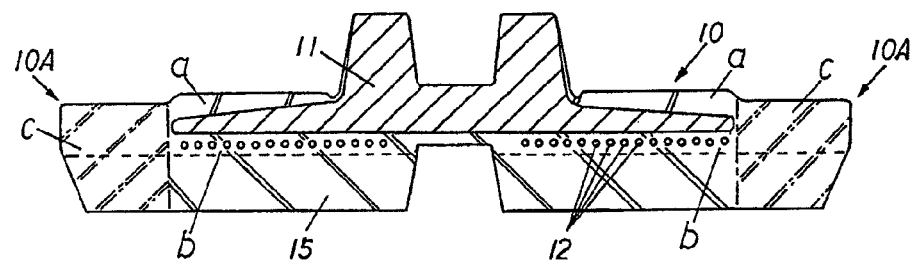
FIG. 4 is a cross-section along the width direction of a metal core-containing rubber crawler track of the present invention.

Further explanation will now be given of the present invention by use of the drawings. FIG. 4 is a cross-section along the width direction of a rubber crawler track of the present invention. The reference numerals 10 to 15 are the same as previously explained and further explanation thereof is omitted.

A rubber crawler track 10 is formed with inner peripheral side rubber a on the inner peripheral side thereof, and outer peripheral side rubber b formed on the outer peripheral side thereof, using SBR rubbers (degree of hardness 65 (JIS A)) with respective characteristics; the end portions of the rubber crawler track 10 further outside than the left and right edges of the metal core 11 are edge rubber c formed from an SBR rubber (degree of hardness 72 (JIS A)).

Figure 1:
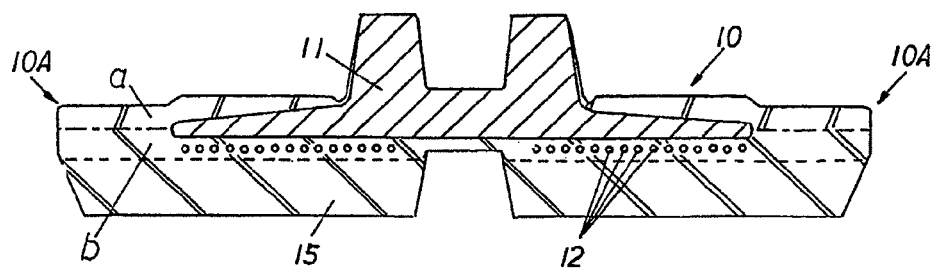
FIG. 1 is a cross-section along the width direction of a related rubber crawler track.
Figure 2:
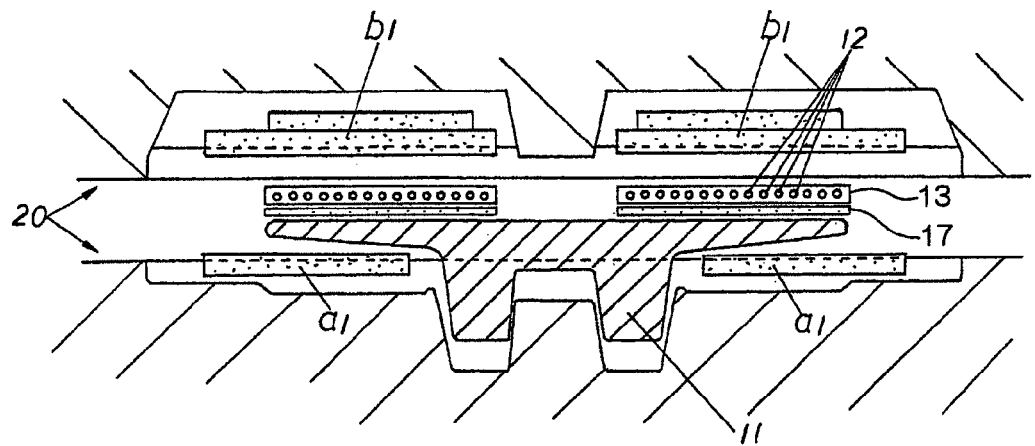
FIG. 2 is a diagram showing the situation during molding of a related rubber crawler track.
Figure 5:
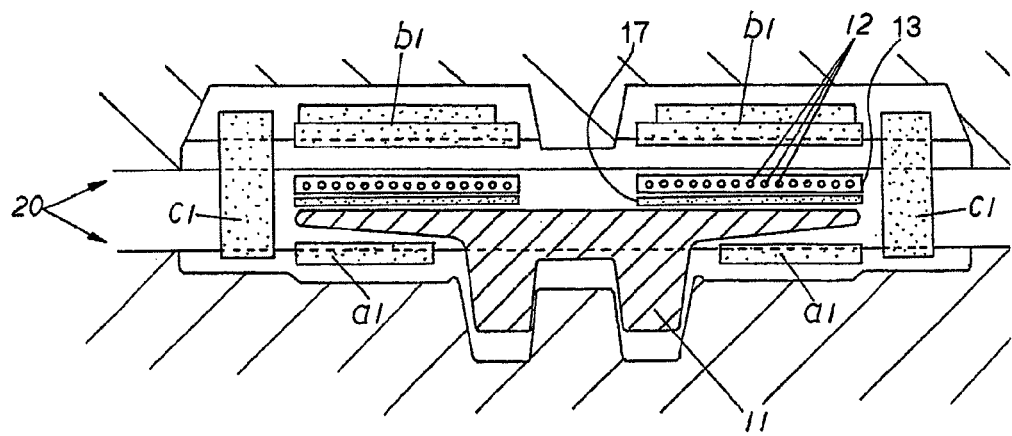
FIG. 5 is a diagram showing the situation during molding of a rubber crawler track of the present invention.

As a molding method, formation is made by, as shown in FIG. 5: setting unvulcanized rubber c1 for configuring the edge rubber c continuously along the longitudinal direction at positions (in this example at both sides) which define the end portions of the rubber crawler track in a mold 20; setting each of the other components explained in FIG. 2 in the mold 20 in a similar manner; and then vulcanizing everything together and molding. It should be noted that in addition to the inner peripheral side rubber a, the outer peripheral side rubber b, and the edge rubber c, there is also a covering rubber 13 provided for covering steel cords 12, and an intermediate rubber 17 provided for adhesion between the metal core 11 and the steel cords 12 covered by the covering rubber 13.

According to the configuration of the present invention, the left and right end portions of the rubber crawler track 10, which contact with low hardness, piled material, are formed of edge rubber c that is different to conventional rubber type. Therefore wear is dramatically reduced, the edge rubber c greatly contributing to an increase in the durability of the rubber crawler track 10.

Figure 3:
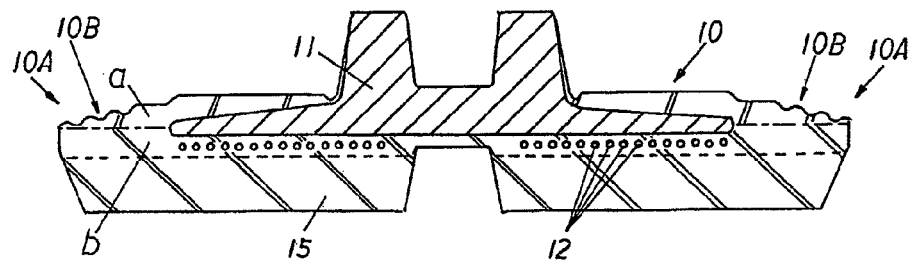
FIG. 3 is a cross-section along the width direction showing the wear of a related rubber crawler track.

In consideration of the problems with the related technology shown in FIG. 3, the edge rubber c is preferably present at least at the inner peripheral side of the end portion, as shown in FIG. 4, thereby wear occurring at from the end portion to the inner peripheral side due to the piled material is improved.

A fundamental difference of invention between the related technology (patent document 1) and the present invention is that the wear resistances thereof are greatly different depending on whether or not a rubber of high hardness degree is used for the whole of the end portion in the width direction of the rubber crawler track. To go further, the technology shown in related technology (patent document 1) simply shows that, for preventing cracks in the vicinity of the edges of the metal core, a fiber layer being curved is disposed with a rubber type of high hardness covering the fiber layer being also curved, and is embedded within ordinary rubber. The type of rubber used in the end portions of the rubber crawler track are fundamentally no different from conventional rubbers, resulting in a structure unable to prevent wear at the position of the rubber crawler track by contacting the piled and hardened mud and sand etc.

High wear resistance is obtained across the whole of the end portions in the peripheral direction of the rubber crawler track 10, by provision of the edge rubber c continuously in the peripheral direction of the rubber crawler track 10.

Figure 6:
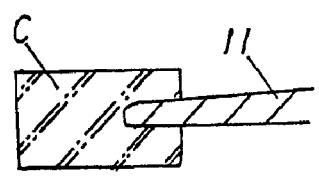
FIG. 6 is an example of an edge rubber (c) applied to an edge portion of a metal core 11.

FIG. 6 is an example of the edge rubber c for the edge of the metal core 11, this being an example in which the edge rubber c is present so as to wrap around the edge of the metal core 11. Wear of the rubber in the vicinity of the edge of the metal core 11 is prevented by configuring in such a manner, avoiding the metal core 11 from protruding out from the rubber due to it.

Other Exemplary Embodiments

Figure 7:
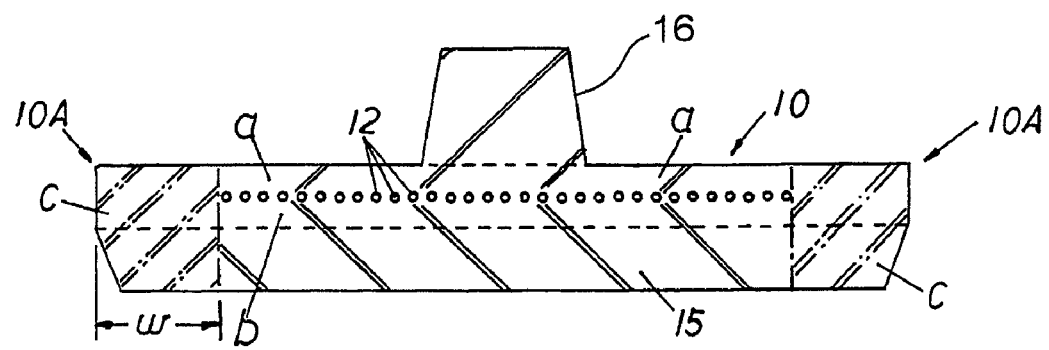
FIG. 7 is a cross-section along the width direction of a metal core-less rubber crawler track of the present invention.
Figure 8:
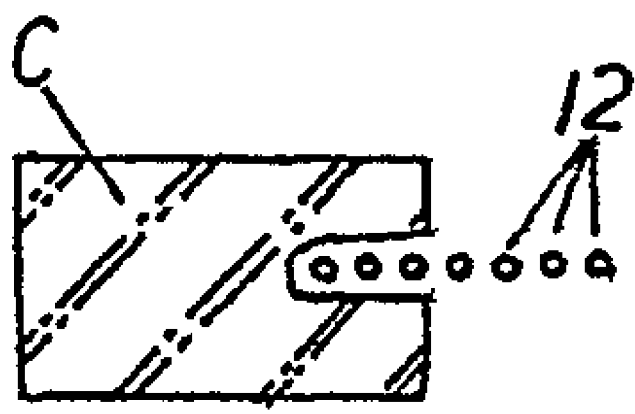
FIG. 8 is an example of an edge rubber (c) wrapped around the edge of the steel cord 12.

FIG. 7 is an example of the invention applied to a metal core-less rubber crawler track, with left and right ends further out than the steel cords 12 formed with edge rubber c. This configuration enables wear to be prevented at the end portions of the rubber crawler track 10, with 25 mm or greater being sufficient for the width w of the edge rubber c. It should be noted that, as shown in FIG. 8, the edge rubber c may obviously also be provided so as to be present so as to wrap around the edge of the steel cord 12, in a similar manner to the metal core case shown in FIG. 6.

With regard to the relationship to the steel cord 12, the edge rubber c is present at the edge of the steel cord 12 when vulcanization molding the rubber crawler track 10, this therefore provides the effect of suppressing the flow of the steel cord 12 during vulcanization, namely suppressing running of the steel cord 12 within the rubber.

While not illustrated in the figures, the ground contact face side of the rubber crawler track 10 may be configured with edge rubber c (namely the outer peripheral side rubber b of the outer peripheral side may be configured with the edge rubber c). This enables the durability to be improved by stopping wear at the ground contact face end portion.

There are also guide projections 16 of projecting shape disposed regularly at the inner peripheral side of the rubber crawler track 10, formed from the inner peripheral side rubber a. The rubber crawler track 10 is wrapped around a non-illustrated sprocket provided at the machine body side, and the guide projections 16 engage with driving recesses provided to the surface of the sprocket. The rubber crawler track 10 is driven by transmission of driving force from the rotating sprocket. In the example of FIG. 7 the guide projection 16 is formed from the inner peripheral side rubber a, however the guide projection 16 may be formed from another rubber with higher hardness degree than the inner peripheral side rubber a or with excellent wear resistance.

INDUSTRIAL APPLICABILITY

In the present invention as above, by employing a different rubber at the left and right end portions of the rubber crawler track to that of the inner peripheral side and outer peripheral side, there is distinctly lower wear of the edge portions even with contact with hardened, piled material. This technology can be employed in a wide range of rubber crawler tracks, irrespective of whether they are of metal core-containing or metal core-less construction.

EXPLANATION OF THE REFERENCE NUMERALS 10 rubber crawler track
10A crawler track edge
10B wear of crawler track edge
11 metal core
12 steel cord
15 rubber lug
20 mold
a inner peripheral side rubber
b outer peripheral side rubber
c edge rubber
a1 inner peripheral side unvulcanized rubber
b1 inner peripheral side unvulcanized rubber
c1 edge unvulcanized rubber
w width of end rubber c

The invention claimed is:

1. A structure of a rubber crawler track in which steel cords are embedded along the longitudinal direction thereof, and a rubber lug is formed at the outer peripheral side thereof, wherein the rubber crawler track is configured to include at least three kinds of rubbers including:
   a first rubber (a) that is disposed at the inner peripheral side of the rubber crawler track;
   a second rubber (b) that is disposed at the outer peripheral side of the rubber crawler track; and
   a third rubber (c) disposed at both end portions in the width direction of the rubber crawler track, such that the third rubber (c) extends along an outer end portion of the first rubber (a) and along an outer end portion of the second rubber (b) in the width direction,
   wherein the third rubber (c) is a single rubber layer having a higher hardness than that of the first rubber (a) and that of the second rubber (b),
   wherein the third rubber (c) is present at least the inner peripheral side of the rubber crawler track,
   wherein the third rubber (c) is present at least the ground contact face of the rubber crawler track, and
   wherein the rubber crawler track is of a metal core-less structure.

2. The structure of a rubber crawler track of claim 1, wherein the hardness of the third rubber (c) is 72 hardness degrees or greater according to JIS A.

3. The structure of a rubber crawler track of claim 1, wherein the third rubber (c) is disposed so as to wrap around an edge portion of the steel cords.

4. The structure of a rubber crawler track of claim 1, wherein the third rubber (c) has a width of at least 25 mm or greater from the end portion of the rubber crawler track.

5. The structure of a rubber crawler track of claim 1, wherein the third rubber (c) is continuous in the peripheral direction.

6. The structure of a rubber crawler track of claim 1, wherein the third rubber (c) is an SBR rubber.

* * * * *